(12) United States Patent
Senff (10) Patent No.: US 7,922,966 B2
(45) Date of Patent: *Apr. 12, 2011

(54) SYSTEMS AND METHODS FOR REMOVING CONTAMINATE MATERIAL FROM A FLOWABLE MATERIAL

(76) Inventor: Anthony N. Senff, Mount Vernon, WA (US)

( * ) Notice: Subject to any disclaimer, the term of this patent is extended or adjusted under 35 U.S.C. 154(b) by 688 days.

This patent is subject to a terminal disclaimer.

(21) Appl. No.: 12/004,008

(22) Filed: Dec. 18, 2007

(65) Prior Publication Data

US 2010/0276354 A1    Nov. 4, 2010

Related U.S. Application Data

(63) Continuation of application No. 11/397,196, filed on Apr. 4, 2006, now Pat. No. 7,314,500, which is a continuation of application No. 10/910,660, filed on Aug. 2, 2004, now Pat. No. 7,022,281, which is a continuation of application No. 10/460,921, filed on Jun. 13, 2003, now Pat. No. 6,780,221, which is a continuation-in-part of application No. 10/431,297, filed on May 6, 2003, now abandoned, which is a continuation-in-part of application No. 09/994,510, filed on Nov. 26, 2001, now Pat. No. 6,558,449.

(51) Int. Cl.
    *C02F 9/02*    (2006.01)
(52) U.S. Cl. .................................. 266/101; 266/170
(58) Field of Classification Search ............... 266/101, 266/170
    See application file for complete search history.

(56) References Cited

U.S. PATENT DOCUMENTS

| | | |
|---|---|---|
| 2,905,323 A | 9/1959 | Megesi |
| 3,369,801 A | 2/1968 | Hartman |
| 3,655,175 A | 4/1972 | Zeleny et al. |
| 3,744,995 A | 7/1973 | MacKay |
| 3,792,845 A | 2/1974 | Larson et al. |
| 3,840,217 A | 10/1974 | MacKay |
| 4,213,600 A | 7/1980 | Thompson, Jr. |
| 4,240,617 A | 12/1980 | MacKay |
| 4,325,732 A | 4/1982 | Woog |
| 4,331,472 A | 5/1982 | King, Jr. |
| 4,441,697 A | 4/1984 | Peterson et al. |
| 4,523,993 A | 6/1985 | Farber |
| 4,662,613 A | 5/1987 | Woog |
| 4,842,644 A | 6/1989 | Senff |
| 4,854,552 A | 8/1989 | Williams |
| 5,112,390 A | 5/1992 | MacKay |
| 5,173,247 A | 12/1992 | Woog |
| 5,229,009 A | 7/1993 | Woog |
| 5,298,170 A | 3/1994 | Woog |
| 5,310,629 A | 5/1994 | McGuckin et al. |
| 5,458,024 A | 10/1995 | Schiller et al. |
| 5,472,176 A | 12/1995 | Azzara |
| 5,603,890 A | 2/1997 | Fuller |

(Continued)

*Primary Examiner* — Scott Kastler
(74) *Attorney, Agent, or Firm* — Michael R. Schacht; Schacht Law Office, Inc.

(57) ABSTRACT

A tank assembly for holding first and second removal materials, comprising a first container and a second container. The first container defines a first chamber. The second container defines a second chamber. The second container is arranged within the first chamber to define a lower portion, an upper portion, and an annular portion of the first chamber. The second chamber comprises a lower portion and a filter portion. The filter portion of the second chamber is adapted to contain the first removal material. The annular portion of the first chamber is adapted to contain the second removal material.

23 Claims, 5 Drawing Sheets

U.S. PATENT DOCUMENTS

| | | |
|---|---|---|
| 5,641,452 A | 6/1997 | Azzara |
| 5,837,188 A | 11/1998 | Peterson |
| 5,900,041 A | 5/1999 | Riviere et al. |
| 6,042,775 A | 3/2000 | Steiner et al. |
| 6,096,209 A | 8/2000 | O'Brien et al. |
| 6,200,521 B1 | 3/2001 | Dodd |
| 6,558,449 B1 | 5/2003 | Senff |
| 6,780,221 B1 | 8/2004 | Senff |
| 7,022,281 B1 | 4/2006 | Senff |
| 7,314,500 B1 * | 1/2008 | Senff .............................. 75/713 |

* cited by examiner

FIG. 7

SYSTEMS AND METHODS FOR REMOVING CONTAMINATE MATERIAL FROM A FLOWABLE MATERIAL

RELATED APPLICATIONS

This is a continuation of U.S. patent application Ser. No. 11/397,196 filed Apr. 4, 2006, now U.S. Pat. No. 7,314,500 which is a continuation of U.S. patent application Ser. No. 10/910,660 filed Aug. 2, 2004, now U.S. Pat. No. 7,022,281 which is a continuation of U.S. patent application Ser. No. 10/460,921, filed Jun. 13, 2003, now U.S. Pat. No. 6,780,221, which is a continuation-in-part of U.S. patent application Ser. No. 10/431,297 filed May 6, 2003, abandoned, which is a continuation-in-part of U.S. patent application Ser. No. 09/994,510 filed Nov. 26, 2001, now U.S. Pat. No. 6,558,449. The contents of all related applications listed above are incorporated herein by reference.

TECHNICAL FIELD

The present invention relates to contaminate removal systems and methods and, more specifically, to such systems adapted to remove a waste metal from a waste solution containing the waste metal.

BACKGROUND OF THE INVENTION

In many situations, certain waste materials must be removed from waste solutions before the solution is allowed to flow into public sewer systems. Typically, the waste solutions are created by a processing facility located in a mall or other building connected to the public sewer system and arranged between the processing facility and the sewer system.

The present invention is of particular significance when used to remove metals from waste solutions destined to flow into a public sewer system. A common example would be a photograph processing facility employing a developing process using silver. Other examples would be fixers and other solutions for photographic, X-ray, and lithographic processes and the tailings from electrolytic plating processes. In all of these situations, environmental laws may require the removal of certain metals from the waste solution. And in some situations, such as when silver is used in a photographic process, the metal to be removed may have value.

Accordingly, a number of systems and methods have been developed for removing metal ions such as silver from a waste solution. The present invention relates to such removal systems that are connected between a drain in which the waste solution is disposed and the public sewer system. These systems typically comprise a two-stage filtration system using steel wool as the reaction media. Such removal systems typically employ two interchangeable containers containing steel wool. The waste solution is caused to flow first through one of containers and then through the other of the containers. Usually, the first container in series is removed and returned for processing, the second container in the series is placed first in the series, and a new container is placed second in the series. The returned containers are typically processed at a central location remote from the source of the waste solution to recover the precipitated metal.

Available metal ion removal systems that employ two stage treatment may be too complex for certain users. Such systems require at least a minimum level of expertise, and the potential exists for error in installation and operation of these systems. In addition, the use of two separate containers increases the possibility for leaks.

The need thus exists for improved systems and methods for the removal of contaminates from solutions that are simpler to operate than known contaminate removal systems.

RELATED ART

The Applicant is the named inventor of U.S. Pat. No. 4,842,644 for a silver recovery method. The '644 patent discloses a single stage filtration process in which a waste solution is forced upwards through a reaction media that removes silver from the waste solution.

The following references were uncovered as part of a professional patentability search conducted on behalf of the Applicant:

U.S. Pat. No. 6,200,521 discloses a two-stage waste recovery system for removing silver from a waste solution; only one of the reaction stages is silver reactive.

U.S. Pat. No. 6,096,209 to O'Brien et al. discloses a three media silver recovery apparatus in which the three media are arranged in series within a single container.

U.S. Pat. No. 5,900,041 to Riviere et al. discloses a metal recovery system that intermingles a reactive media such as strands of steel wool with a support structure of an inert material to encourage non-channeling random flow paths.

U.S. Pat. No. 5,837,188 to Peterson discloses a silver recovery system employing a single silver reactive stage.

U.S. Pat. No. 5,641,452 to Azzara discloses a silver recovery system having an outer container and a silver recovery cartridge formed by a liner containing a reactive material.

U.S. Pat. No. 5,603,890 to Fuller discloses a silver recovery device having a hollow core of reactive material arranged within a container. Fluid flows into the container and then laterally through the hollow core to an outlet pipe arranged at the center of the core.

U.S. Pat. No. 5,472,176 to Azzara discloses a silver recovery device employing an inner chamber and an outer chamber. The inner chamber contains a reactive media; the waste solution flows down through the reactive media and into the outer chamber and then up to an outlet.

U.S. Pat. No. 5,458,024 to Schiller et al. discloses a silvery recovery system having a fiber pads arranged above and below a reactive media.

U.S. Pat. No. 5,310,629 to McGuckin et al. discloses a silver recover element in the form of a cylindrical flow-through cylinder having a hollow core and an external substrate layer containing physical development nuclei.

U.S. Pat. No. 5,298,170 to Woog discloses a device defining a chamber in which spent photographic developer and fixer is mixed and neutralized. The waste solution is passed through a vertical conduit containing iron and then across steel wool at the bottom of the device.

U.S. Pat. No. 5,229,009 to Woog discloses a mixing chamber having a length of ribbon defining a tortuous flow path to encourage mixing of photographic developer and fixer as they flow through reactive material within the chamber.

U.S. Pat. No. 5,173,247 to Woog discloses a silver recovery device using plastic chips to stabilize scrap metal within a container.

U.S. Pat. No. 5,112,390 to MacKay discloses a single stage silver recovery system having a replaceable core.

U.S. Pat. No. 4,854,552 discloses a silver recovery system employing steel wool in a vessel with a metal salt of copper or cadmium.

U.S. Pat. No. 4,662,613 to Woog discloses a reusable metal recovery cartridge having a housing that contains a spiral rolled exchange mass containing particles of the recovery media.

U.S. Pat. No. 4,523,993 to Farber discloses a silver recovery system comprising an outer vessel and a perforated inner vessel containing reactive media. The waste solution is poured into the inner vessel as the inner vessel is rotated to encourage desirable flow through the reactive media.

U.S. Pat. No. 4,441,697 to Peterson et al. discloses a silver recovery unit having an elongate core and an aperture in the side thereof. Inner and outer reactive media are arranged within the core on either side of a baffle to enhance the flow path through the unit.

U.S. Pat. No. 4,331,472 to King, Jr. discloses a metal removal apparatus and method employs buoyant elements comprising a substrate coated with a reaction media.

U.S. Pat. No. 4,325,732 to Woog discloses a silver recovery cartridge containing a rolled mat to which a silver reactive material is adhered.

U.S. Pat. No. 4,240,617 to MacKay discloses a cartridge for recovering silver comprising a spiral rolled iron window screen. The waste solution flows down through the screen and then up through an outlet tube extending down the middle of the rolled window screen.

U.S. Pat. No. 4,213,600 to Thompson, Jr. discloses a silver reclamation system comprising reactive and non-reactive layers arranged in successive layers within a housing.

U.S. Pat. No. 3,840,217 to MacKay discloses a silver recovery system employing a woven screen of a reactive material that is wound upon itself to form a reactive media that precipitates silver.

U.S. Pat. No. 3,744,995 to MacKay discloses a silver recovery system comprising a metallic core of window screen that allows transverse flow.

U.S. Pat. No. 3,655,175 to Zeleny et al. discloses a process for recovering metal from a solution in which the housing is disposed of during the recovery process.

U.S. Pat. No. 3,369,801 to Hartman discloses a silver recovery system that forces waste solution down through an inlet pipe, up through a reactive media, and then out through an annular chamber defined by an outlet pipe surrounding the inlet pipe.

U.S. Pat. No. 3,792,845 to Larson et al. discloses a silver recovery cartridge comprising an outer container having a drum, a lid, and a rim clamp that secures the lid on the drum.

U.S. Pat. No. 2,905,323 to Megesi discloses a silver recover system comprising a housing divided into upper, middle, and lower sections by two perforated plates. The recovery media is located within the middle sections. A pipe allows fluid to bypass the middle section when the recovery media becomes clogged.

SUMMARY OF THE INVENTION

The present invention may be embodied as a tank assembly for holding first and second removal materials comprising a first container and a second container. The first container defines a first chamber. The second container defines a second chamber. The second container is arranged within the first chamber to define a lower portion, an upper portion, and an annular portion of the first chamber. The second chamber comprises a lower portion and a filter portion. The filter portion of the second chamber is adapted to contain the first removal material. The annular portion of the first chamber is adapted to contain the second removal material.

DETAILED DESCRIPTION OF THE INVENTION

The present invention may be implemented in many different embodiments, and two of these embodiments will be described below.

Turning now to the drawing, depicted at 20 in FIGS. 1-5 is a first embodiment of a removal system constructed in accord with, and embodying, the principles of the present invention. The example removal system 20 described herein recovers silver from a waste solution, but the present invention may have application to other waste metals as well. The example removal system 20 comprises a first container 22 defining a first chamber 24 and second container 26 defining a second chamber 28.

Figure 1:
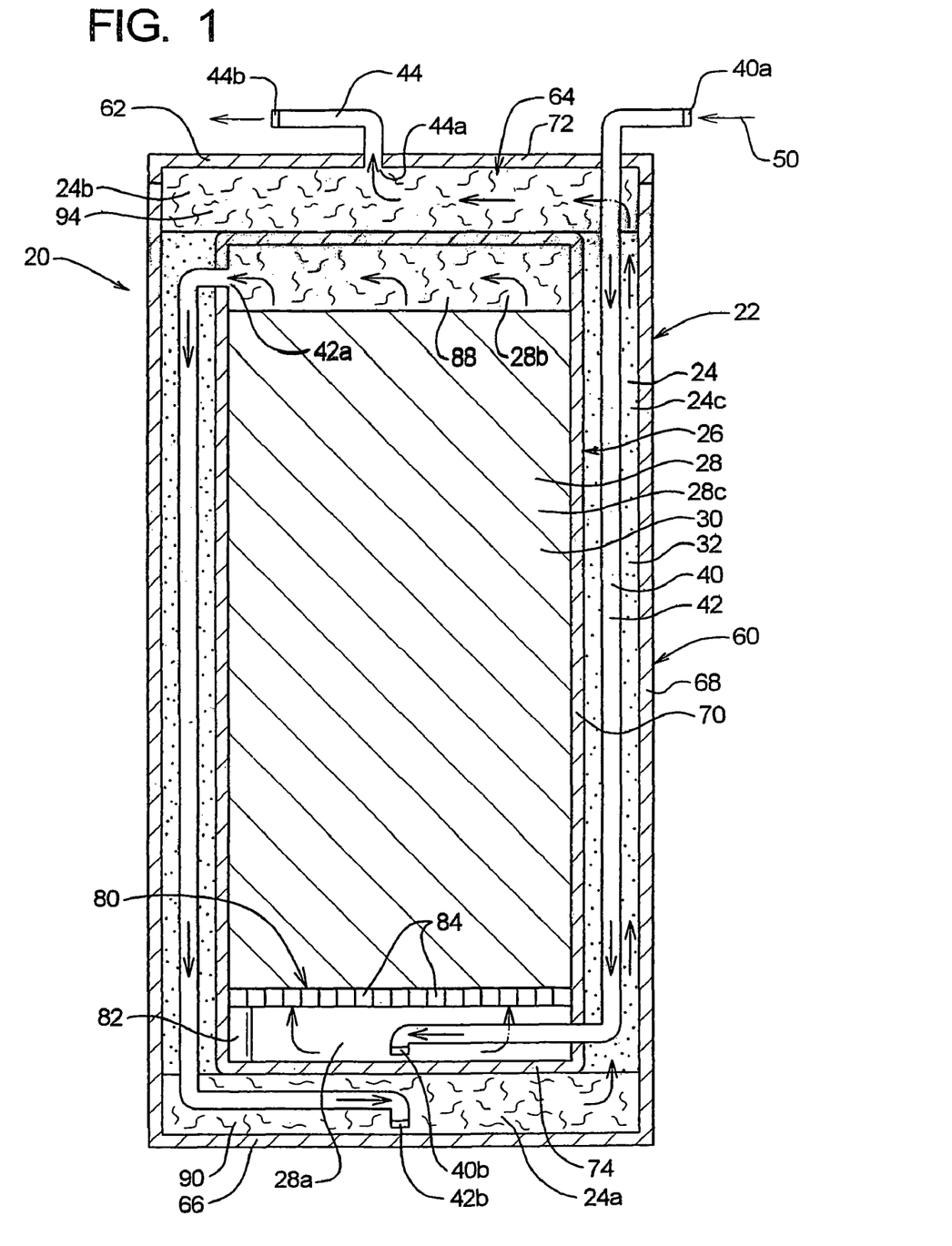
FIG. 1 is a section view of a first embodiment of a metal removal system of the present invention.

A mass of a first reaction media 30 is arranged within the second chamber 26. A mass of a second reaction media 32 is arranged within the first chamber 24. The waste solution is forced through the first and second reaction media 30 and 32 such that the media 30 and 32 react with and thus remove the waste metal from the waste solution being processed.

The reaction media 30 and 32 both contain a metal above the waste metal in the electromotive force series. In the example system 20, the reaction media 30 and 32 both are or contain iron in a form capable of reacting and bonding with silver in the waste solution to precipitate the silver out of the waste solution. Other reaction media may be preferable for other waste metals.

The example first and second containers 22 and 26 are cylindrical, but other shapes may be used. In addition, in the example system 20 the second container 26 is disposed within the first chamber 24 of the first container 22 such that the longitudinal axis of the second container 26 is aligned with the longitudinal axis of the first container 22. Again, other arrangements may be employed, but the example arrangement of coaxially aligned cylindrical containers 22 and 26 is preferred. With this arrangement, the first chamber 24 defines an effective available volume in the form of a hollow cylindrical space in which the second reaction media 32 is contained during normal use.

With the foregoing arrangement of the first and second containers 22 and 26, the example removal system 20 further comprises an inlet conduit 40, an intermediate conduit 42, and an outlet conduit 44. The inlet conduit 40 allows fluid to flow from the exterior of the first container 22 to the second chamber 28. The intermediate conduit 42 allows fluid to flow from the second chamber 28 into the first chamber 24. The outlet conduit 44 allows fluid to flow from the first chamber 24 to the exterior of the first container 22. The waste solution to be processed is thus forced along a removal path 50 extending through the inlet conduit 40, the second chamber 28, the intermediate conduit 42, the first chamber 24, and the outlet conduit 44.

To improve fluid flow through the reaction media, in the example removal system 20 the waste solution is forced into the bottom of the first and second chambers 24 and 28 and up through the reaction media 30 and 32. This flow path creates a more even distribution of waste solution over the volume of the reaction media.

In particular, in the example removal system 20 the first container 22 is an assembly comprising a container member 60 and a first cap member 62. The container member 60 further defines an upper opening 64 a bottom wall 66 and a side wall 68. The cap member 62 seals the upper opening 64 in the container member such that the first chamber 24 is substantially fluid tight.

The example second container 26 is also an assembly and comprises a cylindrical body 70 and upper and lower second cap members 72 and 74. The second cap members 72 and 74 are attached to the body 70 such that the second chamber 28 is also substantially fluid tight.

The example inlet conduit 40 extends through the cap member 62 of the first container 22 and through the body 70 of the second container 26. The inlet conduit 40 defines an inlet fitting 40a and a first diffuser 40b. The inlet fitting is located outside of the first container 24. The first diffuser 40b is arranged in a lower portion 28a of the second chamber 28.

The example intermediate conduit 42 defines an intermediate port 42a and a second diffuser 42b. The intermediate conduit 42 is located in an upper portion 28b of the second chamber 28. The second diffuser 42b is arranged in a lower portion 24a of the first chamber 24.

The example outlet conduit 44 defines an outlet port 44a and an outlet fitting 44b. The outlet port 44a is located in an upper portion 24b of the first chamber 24. The outlet conduit 44 extends through the first cap member 62 such that the outlet fitting 44b is arranged outside of the first container 22.

Typically, the inlet fitting 40a is connected by conventional hose or pipe to a drain of an appliance or sink that is the source of the waste solution. The waste solution thus enters the system through the inlet fitting 40a. The outlet fitting 44b is connected to a disposal point, typically a connection to the sewer system or the like, for disposal of processed waste solution.

The arrangement of the example conduits 40, 42, and 44 allows the waste solution to be forced into the system 20 through the inlet fitting 40a, along the removal path 50 up through the first and second reaction media 30 and 32 in sequence, and then out to the disposal point.

Additional details of the construction and operation of the example removal system 20 will now be described with reference to FIGS. 2-5. For clarity and simplicity, the conduits 40, 42, and 44 are not depicted in FIGS. 2-5.

A conventional reaction media used for removing silver from a waste solution is chopped steel wool. Chopped steel wool is very cost effective but must be packed into the container to optimize the amount of steel wool contained in a given volume. Additionally, chopped steel wool does not pack well using vibration; the packing process for chopped steel wool is normally performed using a ram to force the steel wool into a smaller volume.

In the context of the present invention, both the first and second reaction media may be formed of chopped steel wool. However, due to manufacturing considerations, in the example system 20 only the first reaction media 30 is formed of chopped steel wool. The example second reaction media 32 is preferably iron resin foam available from Capital Resin Corp of Columbus, Ohio, as CRC-IRF (MA). The Applicant understands that this product contains approximately 1.25 percent by weight of Manganese, 0.15 percent by weight of Silicon, and the balance by weight being Iron.

The preferred iron resin foam material contains a high percentage of iron, like the chopped steel wool, but is in an a granular or pelletized form that allows a desired amount of the second reaction media 32 to be packed into the effective available volume of the first chamber without the use of a ram. In contrast, the preferred iron resin foam may be vibrated into a desired volume or space. Other materials may be substituted for the preferred iron resin foam as long as the substitute material may be compacted easily and contains a high percentage of iron in a form that may react with the waste metal in the waste solution. In the context of the example removal system 20 then, the preferred first reaction medial 30 is thus chopped steel wool and the preferred second filter material 32 is iron resin foam.

Figure 2:
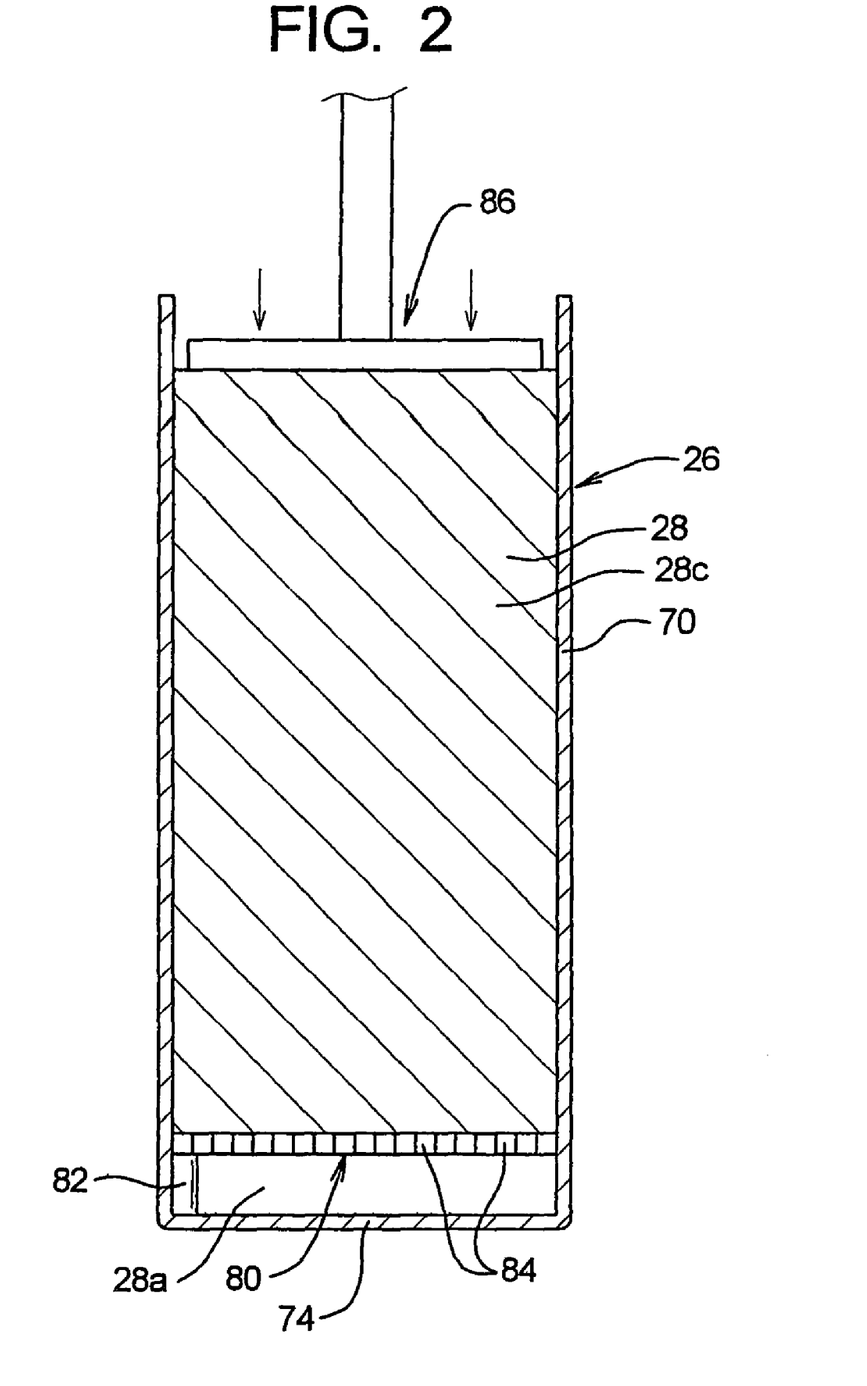
FIG. 2 is a section view of the inner container of the assembly of FIG. 1 illustrating the compacting of the media within the container.

Referring to FIG. 2, depicted therein is the main body 70 of the second container 26 and the bottom second cap 74. FIG. 2 also shows that the second container 26 comprises an optional bottom grate 80 and grate support member 82. The grate support member 82 supports the bottom grate 80 within the second chamber 28.

The grate support 82 determines the relative sizes of the upper and lower compartments by spacing the bottom grate 80 a predetermined distance from the bottom second cap 74. So supported, the bottom grate 80 divides the second chamber 28 into a filter portion 28c and the lower portion 28a described above; openings 84 in the bottom grate 80 allow fluid flow between the two portions 28c and 28a of the chamber 28.

To construct the system 20, the grate support 82 is first placed into the second chamber 28 onto the bottom second cap 74. The bottom grate 80 is then placed into the second chamber 28 on the grate support member 82 to define the lower and filter portions 28a and 28c of the second chamber 28. The first reaction media 30 is then placed into the second chamber 28 on top of the bottom grate 80. A ram 86 is then forced against the chopped steel wool forming the first reaction media 30 to compact the steel wool into the filter portion 28c of the second chamber 28. The openings 84 in the bottom grate 80 are sized and dimensioned substantially to prevent a majority, and preferably all, of the steel wool reaction media 30 from migrating from the filter portion 28c into the lower portion 28a.

Figure 3:
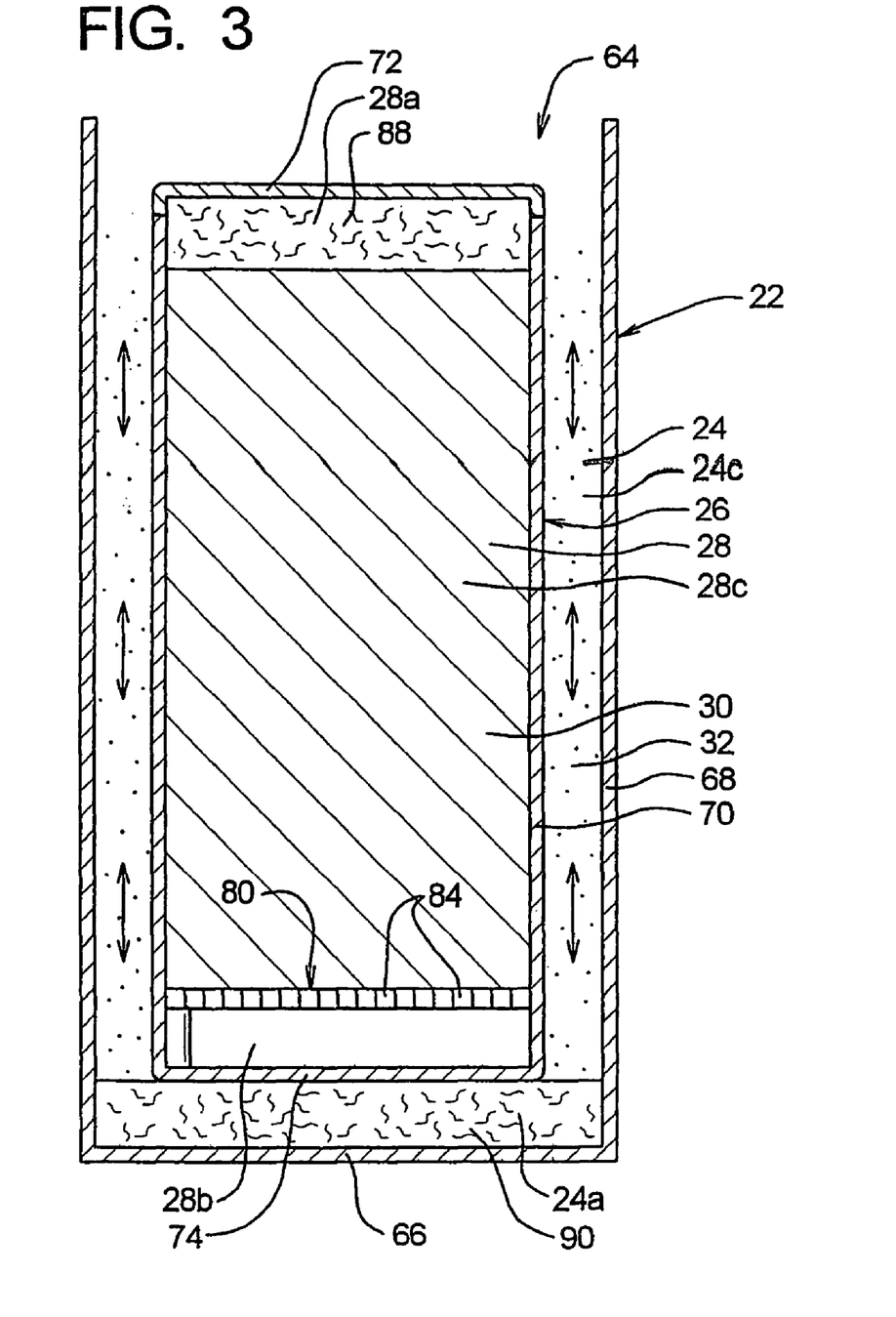
FIG. 3 is a section view showing the inner container of the assembly of FIG. 1 with the media in place and positioned within the outer container and in which the media in the outer container is agitated.

Referring now to FIG. 3, an optional inner fiber pad 88 is placed into the second chamber 28 on top of the compacted reaction media 30. The inner fiber pad is conventionally made of a loosely matted or woven material that acts as a particle filter for the first reaction media 30 and thereby substantially prevents the reaction media 30 from entering the intermediate conduit 42. The inner fiber pad 88 defines the upper portion 28b of the second chamber 28. The upper second lid 72 is then secured to the main body 70 to form the second container 26.

FIG. 3 also shows that the second container 26, with the first reaction media 30 sealed inside as just described, is placed into the first chamber 24. In particular, an optional lower outer fiber pad 90 is placed into the first chamber 24 to define the lower portion 24a thereof. The lower outer fiber pad 90 is also conventionally made of a loosely matted or woven material that acts as a particle filter for the second reaction media 32 and thereby substantially prevents the reaction media 32 from entering the intermediate conduit 42.

Figure 4:
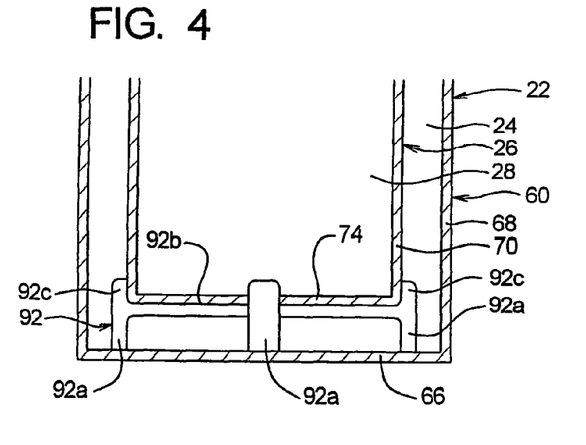
FIG. 4 is a section view showing portions of the inner and outer containers in the assembly of FIG. 1 in which one example structure for supporting and positioning the inner container is illustrated.
Figures 5, 6:
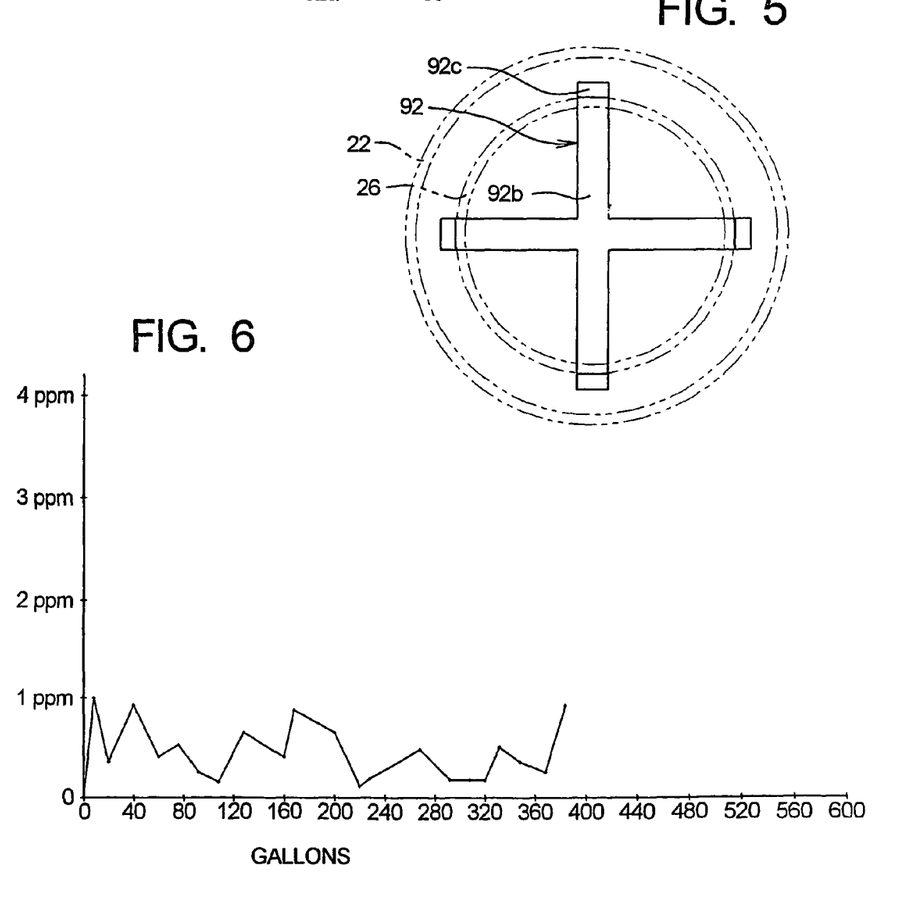
FIG. 5 is a plan section view of the example support structure illustrated in FIG. 4.
FIG. 6 is a plot of silver concentration in a sample solution passed through the treatment assembly of this invention.

The second container 26 may either rest on the lower outer fiber pad 90, or, as shown in FIGS. 4 and 5, a support stand 92 may be placed in the first chamber 24 to support the second container 26. The optional support stand 92 comprises a plurality of foot portions 92a that extend through the lower outer fiber pad 90 to contact the bottom wall 66 of container 60. The support stand 92 further defines a support surface 92b and alignment projections 92c. The support surface 92b engages the bottom wall 74 of the container 26, while the alignment projections 92c engage the main body 70 of the second container 26.

The lower outer fiber pad 90 and second container 26 define the bottom and sides of a filter portion 24c of the first chamber 24. The filter portion 24c of the chamber 24 is in the shape of a hollow cylindrical space that is substantially aligned with the longitudinal axes of the containers 22 and 26.

The iron resin foam forming the second reaction media 32 is then inserted into the filter portion 24c of the first chamber 24. The first container 22, as well as the contents thereof, are then vibrated along the longitudinal axes of the containers 22 and 26 to compact the second reaction media within the filter portion 24c. An optional upper outer fiber pad 94 is then placed on top of the second container 26 and the second reaction media 32 to define the upper portion 24b of the first chamber 24. The upper outer fiber pad 94 is also conventionally made of a loosely matted or woven material that acts as a particle filter for the second reaction media 32 and thereby substantially prevents the reaction media 32 from entering the outlet conduit 44.

The first cap member 62 is then secured to the first container member 60 to seal the first chamber 24 and obtain the example removal system 20.

The inlet fitting 40a is then connected to the source of the waste solution. The waste solution thus passes through the inlet conduit 40, the openings 84 in the grate 80, the first reaction media 30, the inner fiber pad 88, the intermediate conduit 42, the lower outer fiber pad 90, the second reaction media 32, the upper outer fiber pad 92, and finally the outlet conduit 44.

Referring now to FIG. 6, depicted therein is a graph illustrating the quantity of waste metal in a sample of waste solution that has been passed through a prototype of the removal system 20. In the situation depicted in FIG. 6, the waste meal is silver and the waste solution is the byproduct of a photographic processing system. This graph illustrates that the processed waste fluid contains less than one part per million of silver after over 600 gallons of fluid processed.

The present invention is thus a two-stage filtration process that does not require the user to understand the filtration process. The iron resin foam used as the second reaction media is relatively expensive and thus is not used as the primary removal mechanism; instead, the first stage is implemented using the first reaction media as the primary removal mechanism, and the second stage is implemented using the second reaction media as a polisher to meet final discharge requirements.

The system 20 is very easy to operate even for a user that does not understand the filtration process. The user simply connects the system 20 inline between the source and destination of the waste solution. The user then replaces the removal system 20 when tests indicated that the system 20 is no longer meeting a certain minimum requirement or, more likely, after a predetermined time period, after a predetermined number of gallons of processed waste solution, or based on some characteristic of the source of the waste solution.

To operate effectively to remove silver from a waste solution, the Applicant has determined that the ratio by weight of the example first reaction media 30 (chopped steel wool) to the example second reaction media 32 (iron resin foam) is preferably approximately 1:2, is preferably within a first preferred range of approximately 1:1 to 1:5, and in any event should be within a second preferred range of approximately 1:5 to 1:10. The actual weights of the first and second reaction media should be calculated to avoid excessive changing out of the removal system 20 in a typical environment but not increase the size of the system 20 beyond what can reasonably be accommodated by typical common carriers. Of course, other ratios may be appropriate to different waste metals and reaction media.

Once the weights of the reaction media are determined, the volumes of the filter portions 24c and 28c of the first and second chambers 24 and 28 can be determined. The volumes of these filter portions 24c and 28c will in turn determine the overall size of a particular removal system 20. All of these decisions will depend upon a specific implementation of the present invention, and the present invention may be embodied in many configurations depending upon the circumstances.

Figure 7:
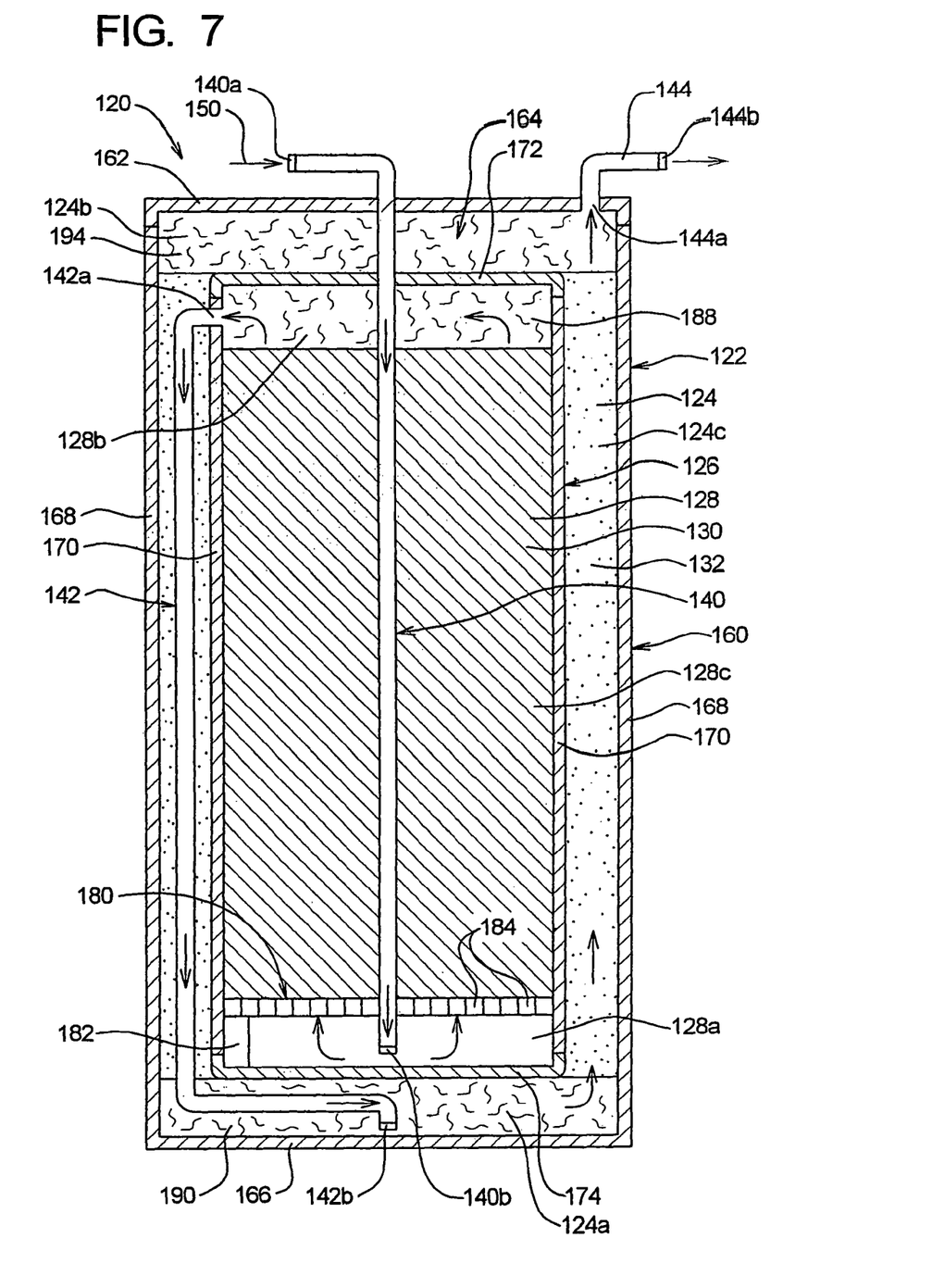
FIG. 7 is a section view of a second embodiment of a metal removal system of the present invention.

Turning now to the drawing, depicted at 120 in FIG. 7 of the drawing is second embodiment of removal system constructed in accord with, and embodying, the principles of the present invention. The removal system 120 is similar to the removal system 20 described above in that both systems 20 and 120 recover silver from a waste solution and may have application to other waste metals as well. The removal system 120 operates in the same basic manner as the system 20 but has been slightly reconfigured.

The removal system 120 comprises a first container 122 defining a first chamber 124 and second container 126 defining a second chamber 128. A mass of a first reaction media 130 is arranged within the second chamber 128. A mass of a second reaction media 132 is arranged within the first chamber 124. The waste solution is forced through the first and second reaction media 130 and 132 such that the media 130 and 132 react with and thus remove the waste metal from the waste solution being processed.

The example reaction media 130 and 132 both contain a metal above the waste metal in the electromotive force series. In the example system 120, the reaction media 130 and 132 both are or contain iron in a form capable of reacting and bonding with silver in the waste solution to precipitate the silver out of the waste solution. Other reaction media may be preferable for other waste metals.

The example first and second containers 122 and 126 are cylindrical, but other shapes may be used. In addition, in the example system 120 the second container 126 is disposed within the first chamber 124 of the first container 122 such that the longitudinal axis of the second container 126 is substantially aligned with the longitudinal axis of the first container 122. Again, other arrangements may be employed, but the example arrangement of coaxially aligned cylindrical containers 122 and 126 is preferred. With this arrangement, the first chamber 124 defines an effective available volume in the form of a hollow cylindrical space in which the second reaction media 132 is contained during normal use.

With the foregoing arrangement of the first and second containers 122 and 126, the example removal system 120 further comprises an inlet conduit 140, an intermediate conduit 142, and an outlet conduit 144. The inlet conduit 140 allows fluid to flow from the exterior of the first container 122 to the second chamber 128. The intermediate conduit 142 allows fluid to flow from the second chamber 128 into the first chamber 124. The outlet conduit 144 allows fluid to flow from the first chamber 124 to the exterior of the first container 122. The waste solution to be processed is thus forced along a removal path 150 extending through the inlet conduit 140, the second chamber 128, the intermediate conduit 142, the first chamber 124, and the outlet conduit 144.

To improve fluid flow through the reaction media, in the example removal system 120 the waste solution is forced into the bottom of the first and second chambers 124 and 128 and up through the reaction media 130 and 132. This flow path creates a more even distribution of waste solution over the volume of the reaction media.

In particular, in the example removal system 120 the first container 122 is an assembly comprising a container member 160 and a first cap member 162. The container member 160 further defines an upper opening 164 a bottom wall 166 and a side wall 168. The cap member 162 seals the upper opening 164 in the container member such that the first chamber 124 is substantially fluid tight.

The example second container 126 is also an assembly and comprises a cylindrical body 170 and upper and lower second cap members 172 and 174. The second cap members 172 and 174 are attached to the body 170 to form annular upper and lower wall portions such that the second chamber 128 is also substantially fluid tight.

The example inlet conduit 140 extends through the cap member 162 of the first container 122 and through the upper cap member 172. In the example removal system 120, the inlet conduit 140 is substantially coaxially aligned with the axes of the containers 122 and 126.

The inlet conduit 140 defines an inlet fitting 140a and a first diffuser 140b. The inlet fitting is located outside of the first container 124. The first diffuser 140b is arranged in a lower portion 128a of the second chamber 128.

The example intermediate conduit 142 defines an intermediate port 142a and a second diffuser 142b. The intermediate conduit 142 connects to an upper portion 128b of the second chamber 128. The second diffuser 142b is arranged in a lower portion 124a of the first chamber 124.

The example outlet conduit 144 defines an outlet port 144a and an outlet fitting 144b. The outlet port 144a is located in an upper portion 124b of the first chamber 124. The outlet conduit 144 extends through the first cap member 162 such that the outlet fitting 144b is arranged outside of the first container 122.

Typically, the inlet fitting 140a is connected by conventional hose or pipe to a drain of an appliance or sink that is the source of the waste solution. The waste solution thus enters the system through the inlet fitting 140a. The outlet fitting 144b is connected to a disposal point, typically a connection to the sewer system or the like, for disposal of processed waste solution.

The arrangement of the example conduits 140, 142, and 144 allows the waste solution to be forced into the system 120 through the inlet fitting 140a, along the removal path 150 up through the first and second reaction media 130 and 132 in sequence, and then out to the disposal point.

FIG. 7 also shows that the second container 126 may comprise an optional bottom grate 180 and grate support member 182. The grate support member 182 supports the bottom grate 180 within the second chamber 128. The grate support 182 spaces the bottom grate 180 a predetermined distance from the bottom second cap 174 such that the bottom grate 180 divides the second chamber 128 into the lower portion 128a and a filter portion 128c. Openings 184 in the bottom grate 180 allow fluid flow between the two portions 128c and 128a of the chamber 128. An optional inner fiber pad 188 is placed into the second chamber 128 on top of the compacted reaction media 130 to define the upper portion 128b of the second chamber 128.

An optional lower outer fiber pad 190 may be placed into the first chamber 124 to define a lower portion 124a thereof. The second container 126 may either rest on the lower outer fiber pad 190 or on a support stand (not shown) placed in the first chamber 124.

The second container 126 defines an upper portion 124b and an annular side portion 124c of the first chamber 124. An optional upper outer fiber pad 194 may be placed on top of the second container 126 and the second reaction media 132 in the upper portion 124b of the first chamber 124.

The operation of the example removal system 120 is substantially the same as that of the removal system 20 and will not be described again in detail. The construction of the example removal system 120 is similar to that of the removal system 20 as shown in FIGS. 2-5. However, the compaction assembly step described with reference to FIG. 2 is modified to accommodate the inlet conduit 140 that extends through the second chamber 128.

From the foregoing, it should be clear that the present invention may be embodied in forms other than those described above. The above-described systems are therefore to be considered in all respects illustrative and not restrictive, the scope of the invention being indicated by the appended claims rather than the foregoing description. All changes that come within the meaning and scope of the claims are intended to be embraced therein.

What is claimed is:

1. A tank assembly for holding first and second removal materials, comprising:
 a first container defining a first chamber;
 a second container defining a second chamber, where
  the second container is arranged within the first chamber to define a lower portion, an upper portion, and an annular portion of the first chamber, and
  the second chamber comprises a lower portion and a filter portion;
 a bottom grate arranged within the second chamber; wherein
 the filter portion of the second chamber is adapted to contain the first removal material;
 the annular portion of the first chamber is adapted to contain the second removal material; and
 the bottom grate divides the second chamber into the lower portion and the filter portion.

2. A tank assembly as recited in claim 1, in which the bottom grate defines openings to allow fluid flow between the filter portion and the lower portion of the second chamber.

3. A tank assembly as recited in claim 1, further comprising a bottom grate adapted to support the first removal material within the filter portion of the second chamber and to allow fluid flow between the filter portion and the lower portion of the second chamber.

4. A tank assembly as recited in claim 1, further comprising an inner fiber pad arranged within the second chamber.

5. A tank assembly as recited in claim 1, further comprising:
 a bottom grate arranged within the second chamber, where the bottom grate is adapted to support the first removal material within the filter portion of the second chamber and to allow fluid flow from the lower portion to the filter portion of the second chamber; and an inner fiber pad arranged within the second chamber, where the inner fiber pad is adapted to support the first removal material within the filter portion of the second chamber and to allow fluid flow from the filter portion of the second chamber to the lower portion of the first chamber through an intermediate conduit.

6. A tank assembly as recited in claim 1, further comprising a lower outer fiber pad arranged within the first chamber, where the lower outer fiber pad is adapted to support the second removal material within the annular portion of the second chamber and to allow fluid flow from the lower portion of the first chamber to the annular portion of the first chamber.

7. A tank assembly as recited in claim 1, further comprising an upper outer fiber pad arranged within the first chamber, where the upper outer fiber pad is adapted to support the second removal material within the annular portion of the second chamber and to allow fluid flow from the annular portion of the first chamber out of the first container.

8. A tank assembly as recited in claim 1, further comprising a support stand arranged within the first chamber to support the second container.

9. A tank assembly as recited in claim 1, further comprising an inlet conduit for allowing fluid flow from the exterior of the first container to the lower portion of the second container.

10. A tank assembly as recited in claim 1, further comprising an outlet conduit for allowing fluid flow from the annular portion of the first chamber to the exterior of the second container.

11. A tank assembly for holding first and second removal materials, comprising:
a first container defining a first chamber;
a second container defining a second chamber, where the second container is arranged within the first chamber to define a lower portion, an upper portion, and an annular portion of the first chamber;
a bottom grate arranged within the second chamber, where the bottom grate divides the second chamber into a lower portion and a filter portion;
a lower outer fiber pad arranged within the first chamber;
an upper outer fiber pad arranged within the first chamber;
an inner fiber pad arranged within the second chamber;
the filter portion of the second chamber is adapted to contain the first removal material; and
the annular portion of the first chamber is adapted to contain the second removal material.

12. A tank assembly as recited in claim 11, in which the bottom grate defines openings to allow fluid flow between the filter portion and the lower portion of the second chamber.

13. A tank assembly as recited in claim 11, in which the bottom grate is adapted to support the first removal material within the filter portion of the second chamber and to allow fluid flow between the filter portion and the lower portion of the second chamber.

14. A tank assembly as recited in claim 11, in which:
the bottom grate is adapted to support the first removal material within the filter portion of the second chamber and to allow fluid flow from the lower portion to the filter portion of the second chamber; and
the inner fiber pad is adapted to support the first removal material within the filter portion of the second chamber and to allow fluid flow from the filter portion of the second chamber to the lower portion of the first chamber through an intermediate conduit.

15. A tank assembly as recited in claim 11, in which the lower outer fiber pad is adapted to support the second removal material within the annular portion of the second chamber and to allow fluid flow from the lower portion of the first chamber to the annular portion of the first chamber.

16. A tank assembly as recited in claim 11, in which the upper outer fiber pad is adapted to support the second removal material within the annular portion of the second chamber and to allow fluid flow from the annular portion of the first chamber out of the first container.

17. A tank assembly as recited in claim 11, further comprising a support stand arranged within the first chamber to support the second container.

18. A tank assembly as recited in claim 11, further comprising an inlet conduit for allowing fluid flow from the exterior of the first container to the lower portion of the second container.

19. A tank assembly as recited in claim 11, further comprising an outlet conduit for allowing fluid flow from the annular portion of the first chamber to the exterior of the second container.

20. A tank assembly for holding first and second removal materials, comprising:
a first container defining a first chamber;
a second container defining a second chamber, where
the second container is arranged within the first chamber to define a lower portion, an upper portion, and an annular portion of the first chamber, and
the second chamber comprises a lower portion and a filter portion; and
a bottom grate adapted to support the first removal material within the filter portion of the second chamber and to allow fluid flow between the filter portion and the lower portion of the second chamber; wherein
the filter portion of the second chamber is adapted to contain the first removal material; and
the annular portion of the first chamber is adapted to contain the second removal material.

21. A tank assembly for holding first and second removal materials, comprising:
a first container defining a first chamber;
a second container defining a second chamber, where
the second container is arranged within the first chamber to define a lower portion, an upper portion, and an annular portion of the first chamber, and
the second chamber comprises a lower portion and a filter portion;
a bottom grate arranged within the second chamber; and
an inner fiber pad arranged within the second chamber; wherein
the filter portion of the second chamber is adapted to contain the first removal material;
the annular portion of the first chamber is adapted to contain the second removal material;
the bottom grate is adapted to support the first removal material within the filter portion of the second chamber and to allow fluid flow from the lower portion to the filter portion of the second chamber; and
the inner fiber pad is adapted to support the first removal material within the filter portion of the second chamber and to allow fluid flow from the filter portion of the second chamber to the lower portion of the first chamber through an intermediate conduit.

22. A tank assembly for holding first and second removal materials, comprising:
a first container defining a first chamber;
a second container defining a second chamber, where the second container is arranged within the first chamber to define a lower portion, an upper portion, and an annular portion of the first chamber, and the second chamber comprises a lower portion and a filter portion; and a lower outer fiber pad arranged within the first chamber; wherein the filter portion of the second chamber is adapted to contain the first removal material;

the annular portion of the first chamber is adapted to contain the second removal material; and the lower outer fiber pad is adapted to support the second removal material within the annular portion of the second chamber and to allow fluid flow from the lower portion of the first chamber to the annular portion of the first chamber.

23. A tank assembly for holding first and second removal materials, comprising:

a first container defining a first chamber;

a second container defining a second chamber, where the second container is arranged within the first chamber to define a lower portion, an upper portion, and an annular portion of the first chamber, and the second chamber comprises a lower portion and a filter portion; and an upper outer fiber pad arranged within the first chamber; wherein the filter portion of the second chamber is adapted to contain the first removal material;

the annular portion of the first chamber is adapted to contain the second removal material; and the upper outer fiber pad is adapted to support the second removal material within the annular portion of the second chamber and to allow fluid flow from the annular portion of the first chamber out of the first container.

* * * * *